United States Patent

Kröckert et al.

[11] Patent Number: 5,290,352
[45] Date of Patent: Mar. 1, 1994

[54] PROCESS FOR THE PREPARATION OF A PIGMENT SUSPENSION

[75] Inventors: Bernd Kröckert, Wesel; Günter Linde, Krefeld, both of Fed. Rep. of Germany

[73] Assignee: Bayer AG, Leverkusen, Fed. Rep. of Germany

[21] Appl. No.: 969,333

[22] PCT Filed: May 6, 1991

[86] PCT No.: PCT/EP91/00850
§ 371 Date: Oct. 25, 1991
§ 102(e) Date: Oct. 25, 1991

[87] PCT Pub. No.: WO91/17866
PCT Pub. Date: Nov. 28, 1991

[30] Foreign Application Priority Data
Nov. 11, 1991 [DE] Fed. Rep. of Germany ....... 4136964

[51] Int. Cl.$^5$ ............................................. C09C 1/36
[52] U.S. Cl. ................................. 106/436; 106/453; 106/456; 106/462
[58] Field of Search ............... 106/436, 443, 453, 456, 106/462

[56] References Cited
U.S. PATENT DOCUMENTS

| | | | |
|---|---|---|---|
| 2,744,029 | 5/1956 | Kingsbury | 106/436 |
| 3,127,280 | 3/1964 | Whately | 106/436 |
| 3,152,000 | 10/1964 | Kingsbury | 106/436 |
| 3,936,304 | 2/1976 | Kasugai et al. | 106/436 |
| 4,280,849 | 7/1981 | Howard et al. | 106/436 |
| 4,288,254 | 9/1981 | Gladu | 106/436 |
| 4,427,451 | 1/1984 | Baloga | 106/436 |
| 4,474,681 | 10/1984 | Belde et al. | 106/436 |
| 4,601,759 | 7/1986 | Furubayashi et al. | 106/436 |
| 4,978,396 | 12/1990 | Story | 106/436 |

OTHER PUBLICATIONS

*Ullmanns Encyclopadie der Technischem Chemie*, 4th new, revised and enlarged Edition, vol. 18, pp. 576–601, no date available.

Winnacker, Küchler–*Chemische Technologie*, "Anorganische Technologie II", vol. 3, 4th Edition, pp. 371–402, no date available.

*Ullmanns Encyclopedia of Industrial Chemistry*, fifth, Completely Revised Edition, vol. B 2, Unit Operations I, Kurt Leschonski, 2, Particle Size Analysis and Characterisation of a Classification Process, pp. 2–30, no date available.

*Primary Examiner*—Mark L. Bell
*Assistant Examiner*—Willie J. Thompson
*Attorney, Agent, or Firm*—Connolly & Hutz

[57] ABSTRACT

Pigment suspensions of inorganic pigments are prepare compacting and grinding the unground pigments on a roller compactor, followed by processing of the compacted pigment in a wet grinding mill with addition of water. The process as described improves the particle size distribution of the pigment.

9 Claims, No Drawings

PROCESS FOR THE PREPARATION OF A PIGMENT SUSPENSION

The present invention relates to a process for the preparation of a pigment suspension from of one or more inorganic pigments and water.

Ground pigment powders and water are generally used for preparing inorganic pigment suspensions. Small quantities of organic or inorganic dispersing agents must sometimes be added.

Pinned disc mills, impeller ring mills, pendulum mills or jet mills are customarily used for grinding the unfinished pigments for the preparation of $TiO_2$ or iron oxide pigments (Ullmanns Encyclopädie der technischen Chemie, 4th new, revised and enlarged Edition, Volume 18, pages 576 and 601).

The ground pigment powders are then dispersed in stirrer vessels, in some cases with the aid of dispersing agents. These vessels may be fitted with intensive mixing devices. The finished suspension may then be marketed as trade product or subjected to further processing for more complete extraction, depending on the purpose for which the pigment is required (Winnacker, Küchler—Chemische Technologie, Volume 3, Anorganische Technologie II, 4th Edition, pages 371 and 402).

A disadvantage of the usual procedure is that the ground pigments can in some cases only be dispersed with a great expenditure of energy as they tend to form lumps when they undergo dispersion. Additional measures such as screening are required for removing agglomerates or aggregates which have not been ground down. Further disadvantages lie in the fact that the pigment must be used as a powder, which produces such a great deal of dust when incorporated in the end product that additional measures must be carried out to prevent excessive dust formation.

It is therefore an object of the present invention to provide a process for the preparation of pigment suspensions which is free from the above-mentioned disadvantages.

It is surprisingly found that this can be achieved by first compacting the unground crude pigment on a roller compacter by which it is ground at the same time, and then treating the resulting compacted granulate, which is relatively free from dust, with water in a wet grinding mill to form the pigment suspension.

This invention thus relates to a process for the preparation of a pigment suspension from one or more inorganic pigments and water, characterised in that the unground pigment is first compacted and ground on a roller compacter and the compacted pigment powder is then treated in a wet grinding mill with the addition of water to produce the finished pigment suspension.

Compacting is preferably carried out at linear forces of from 1 to 60 KN/cm. The wet grinding is preferably carried out in vibrating ball mills (intermittently or continuously) or pearl mills (upright or horizontal).

Exceptionally good results are obtained when the solids content of the suspension amounts to 5 to 75% by weight, preferably from 15 to 65% by weight.

It is particularly advantageous to carry out the process according to the invention in the presence of from 0.05 to 5% by weight of organic or inorganic additives as dispersing agents, preferably phosphates, based on the solids content.

It may also be advantageous to thicken the finished pigment suspension to a higher solids content than the starting suspension by filtration and/or sedimentation.

The pigment suspension obtained by the process according to the invention contains a very small proportion of particles greater than 40 μm and has an improved particle size distribution. The particle size distribution is determined according to Ullmanns Encyclopedia of Industrial Chemistry, Fifth, Completely Revised Edition, Volume B 2, Unit Operations I, Kurt Leschonski, 2. Particle Size Analysis and Characterisation of a Classification Process (pages 2–30).

To determine the sieve residues, 1 liter of the suspension was introduced into a 40 μm sieve which was then rinsed with 10–15 ml of water. The sieve was then dried and weighed. The percentages by weight refer to the weight differences of the sieve.

The process according to the invention is applicable to all inorganic pigments and fillers. Iron oxides, titanium dioxide, chromium oxide and/or mixed phase pigments are particularly preferred inorganic pigments.

The invention is described below with the aid of Examples, which are not to be regarded as limiting.

EXAMPLE 1

A titanium dioxide raw material (starting material for the Trade Product of Bayer AG, Bayertitan ® R-KB-2), i.e. a product without after-treatment, was compacted on a commercial roller mill with a linear force of 40 kN/cm without the addition of a grinding auxiliary.

The dust-free compacted granulate obtained by compacting was then disagglomerated for one hour in the form of a suspension containing 20% by weight of $TiO_2$ in a vibrating ball mill containing a 50:50 mixture of 8 mm and 12 mm steatite balls. A thin suspension leaving a residue of 0.9% by weight on a 40 μm sieve was obtained.

When a pigment suspension containing 20% by weight of $TiO_2$ was prepared by conventional grinding in a stirrer vessel, the residue on the 40 μm sieve was 1.4% by weight.

A comparison between the particle size distributions shows the improvement in the reduced proportion of coarse particles (C) and the reduction in the range of particle sizes (C-A/B).

Data in which the particle size in μm is smaller by 10%, 50% or 90% of the total quantity than the given numerical value.

|  | 10% A | 50% B | 90% C | Range of particle size distribution C-A/B |
|---|---|---|---|---|
| earlier process | 0.19 | 0.41 | 0.91 | 1.78 |
| process according to the invention | 0.22 | 0.39 | 0.68 | 1.17 |

EXAMPLE 2

Compacting of the crude pigment $TiO_2$ was carried out as in Example 1 but with a linear force of 25 kN/cm. A suspension containing 25% by weight of $TiO_2$ and 0.2% by weight of sodium hexametaphosphate was then prepared and disagglomerated in a continuously operating vibrating ball mill (Palla mill) containing 2.5–3.5 steatite balls. The residence time of the suspension in the mill was 15 minutes. The sieve residue on the 40 μm sieve was 0.05% by weight.

The residue obtained on a 40 μm sieve from a pigment suspension containing 25% by weight of TiO$_2$ prepared by conventional grinding in a stirrer vessel was 0.9% by weight. A comparison of the particle size distributions shows the improvement obtained, i.e. the reduced proportion of coarse particles (C) and the reduction in the range of particle sizes (C-A/B).

Data in which the particle size in μm is smaller by 10%, 50% or 90% of the total quantity than the given numerical value:

|  | 10% A | 50% B | 90% C | Range of particle sizes C-A/B |
| --- | --- | --- | --- | --- |
| earlier process | 0.19 | 0.42 | 0.93 | 1.76 |
| process according to the invention | 0.25 | 0.38 | 0.59 | 0.91 |

EXAMPLE 3

An unground red iron oxide pigment (starting material for the Trade Product of Bayer AG, Bayferrox® 130) was compacted with a linear force of 30 kN/cm. The dust-free granulate obtained by compacting was then disagglomerated in the form of a suspension with a 50% by weight solids content in a vibrating ball mill as in Example 1. A pigment suspension leaving a residue of 0.3% by weight on the 40 μm sieve was obtained.

A pigment suspension containing 50% by weight of red iron oxide prepared by conventional grinding in a stirrer vessel leaves a residue of 0.8% by weight on the 40 μm sieve. Comparison of the particle size distributions shows the improvement in the reduced proportion of coarse particles (C) and the reduction in the range of particle sizes (C-A/B).

Data in which the particle size in μm is smaller by 10%, 50% or 90% of the total quantity than the given numerical value:

|  | 10% A | 50% B | 90% C | Range of particle sizes C-A/B |
| --- | --- | --- | --- | --- |
| earlier process | 0.29 | 0.48 | 0.73 | 1.24 |
| process according to the invention | 0.31 | 0.45 | 0.68 | 0.81 |

What is claimed is:

1. A process for the preparation of a pigment suspension from one or more inorganic pigments and water, comprising first compacting and grinding unground pigment on a roller compactor, followed by processing the compacted pigment powder in a wet grinding mill with the addition of water to produce the finished pigment suspension.

2. A process according the claim 1, wherein compacting is carried out at linear forces of from 1 to 60 kN/cm.

3. A process according to claim 1, wherein wet grinding is carried out in vibrating ball mills or pearl mills.

4. A process according to claim 1, wherein the solids content of the suspension is from 5 to 75% by weight.

5. A process according to claim 4, wherein the solids content of the suspension is from 15 to 65% by weight.

6. A process according to claim 1, wherein the process is carried out in the presence of from 0.05 to 5% by weight of organic or inorganic additives as dispersing auxiliaries, based on the solids content.

7. A process according to claim 6, wherein the additive is a phosphate.

8. A process according to claim 1, further comprising thickening the finished pigment suspension to a higher solids content by filtration or sedimentation.

9. A process according to claim 1, wherein the inorganic pigments are iron oxides, titanium dioxide, chromium oxide, mixed phase pigments, or mixtures thereof.

* * * * *